US011056681B2

(12) United States Patent
Furuichi et al.

(10) Patent No.: US 11,056,681 B2
(45) Date of Patent: Jul. 6, 2021

(54) POSITIVE ELECTRODE ACTIVE MATERIAL FOR NONAQUEOUS ELECTROLYTE SECONDARY BATTERY, METHOD FOR PRODUCING SAME, AND NONAQUEOUS ELECTROLYTE SECONDARY BATTERY USING SAID POSITIVE ELECTRODE ACTIVE MATERIAL

(71) Applicant: SUMITOMO METAL MINING CO., LTD., Tokyo (JP)

(72) Inventors: Yuki Furuichi, Niihama (JP); Tetsufumi Komukai, Niihama (JP); Hiroyuki Toya, Niihama (JP)

(73) Assignee: Sumitomo Metal Mining Co., Ltd.

( * ) Notice: Subject to any disclaimer, the term of this patent is extended or adjusted under 35 U.S.C. 154(b) by 0 days.

(21) Appl. No.: 17/007,707

(22) Filed: Aug. 31, 2020

(65) Prior Publication Data

US 2020/0403218 A1   Dec. 24, 2020

Related U.S. Application Data

(62) Division of application No. 15/568,567, filed as application No. PCT/JP2016/062139 on Apr. 15, 2016, now Pat. No. 10,797,302.

(30) Foreign Application Priority Data

Apr. 24, 2015 (JP) .................... 2015-089677
Oct. 28, 2015 (JP) .................... 2015-212404

(51) Int. Cl.
  *H01B 1/08* (2006.01)
  *H01M 4/04* (2006.01)
  (Continued)

(52) U.S. Cl.
  CPC ............ *H01M 4/131* (2013.01); *C01G 53/04* (2013.01); *C01G 53/50* (2013.01); *H01B 1/08* (2013.01);
  (Continued)

(58) Field of Classification Search
  CPC ......... H01B 1/00; H01B 1/08; H01M 4/0471; C01P 2004/32
  See application file for complete search history.

(56) References Cited

U.S. PATENT DOCUMENTS 9,130,212 B1 * 9/2015 Kokado ............... H01M 4/131
10,177,373 B2   1/2019 Yokoyama et al.
(Continued)

FOREIGN PATENT DOCUMENTS

JP   11-16566      1/1999
JP   2005-251716   9/2005
(Continued)

OTHER PUBLICATIONS

International Search Report dated Jul. 19, 2016.

*Primary Examiner* — Mark Kopec
(74) *Attorney, Agent, or Firm* — Gerald E. Hespos; Michael J. Porco; Matthew T. Hespos

(57) ABSTRACT

Provided is a method for producing the positive electrode active material for nonaqueous electrolyte secondary batteries, including a first step of mixing a Li-metal composite oxide powder which is represented by the general formula: $Li_zNi_{1-x-y}Co_xM_yO_2$ (where $0 \leq x \leq 0.35$, $0 \leq y \leq 0.35$, and $0.97 \leq z \leq 1.30$ are satisfied, and M is at least one element selected from Mn, V, Mg, Mo, Nb, Ti and Al) and constituted by primary particles and secondary particles, to an alkaline solution with a W compound dissolved therein, and immersing a resulting mixture, followed by solid-liquid separation, to obtain a W mixture with W uniformly dispersed on the (Continued)

surface of the primary particles of the composite oxide, and a second step of heat-treating the W mixture to thereby form a compound containing W and Li on the surface of the primary particles of the composite oxide powder.

10 Claims, 3 Drawing Sheets

(51) Int. Cl.
| | |
|---|---|
| *H01M 4/131* | (2010.01) |
| *H01M 4/505* | (2010.01) |
| *H01M 4/525* | (2010.01) |
| *H01M 4/62* | (2006.01) |
| *C01G 53/00* | (2006.01) |
| *H01M 4/36* | (2006.01) |
| *C01G 53/04* | (2006.01) |
| *H01M 10/0525* | (2010.01) |

(52) U.S. Cl.
CPC ......... *H01M 4/0471* (2013.01); *H01M 4/366* (2013.01); *H01M 4/505* (2013.01); *H01M 4/525* (2013.01); *H01M 4/62* (2013.01); *H01M 10/0525* (2013.01); *C01P 2002/50* (2013.01); *C01P 2002/52* (2013.01); *C01P 2004/03* (2013.01); *C01P 2004/61* (2013.01); *C01P 2004/64* (2013.01); *C01P 2006/12* (2013.01); *C01P 2006/80* (2013.01); *H01M 2220/20* (2013.01); *H01M 2220/30* (2013.01)

(56) References Cited

U.S. PATENT DOCUMENTS

| | | | |
|---|---|---|---|
| 10,497,936 | B2 | 12/2019 | Kondo et al. |
| 10,797,302 | B2 * | 10/2020 | Furuichi ................. H01B 1/08 |
| 2010/0209771 | A1 | 8/2010 | Shizuka et al. |
| 2012/0276454 | A1 | 11/2012 | Mori et al. |
| 2015/0228974 | A1 | 8/2015 | Kokado et al. |
| 2016/0372748 | A1 * | 12/2016 | Nakayama ............ H01M 4/525 |
| 2018/0047977 | A1 | 2/2018 | Furuichi et al. |

FOREIGN PATENT DOCUMENTS

| | | |
|---|---|---|
| JP | 2009-289726 | 12/2009 |
| JP | 2010-40383 | 2/2010 |
| JP | 2011-216214 | 10/2011 |
| JP | 2012-79464 | 4/2012 |
| JP | 2013-125732 | 8/2013 |
| JP | 2013-152866 | 8/2013 |
| JP | 2014-146473 | 8/2014 |
| WO | WO 2012043783 A1 * | 4/2012 |
| WO | 2016/084931 | 6/2016 |

* cited by examiner

POSITIVE ELECTRODE ACTIVE MATERIAL FOR NONAQUEOUS ELECTROLYTE SECONDARY BATTERY, METHOD FOR PRODUCING SAME, AND NONAQUEOUS ELECTROLYTE SECONDARY BATTERY USING SAID POSITIVE ELECTRODE ACTIVE MATERIAL

The present application is a divisional application of U.S. patent application Ser. No. 15/568,567, filed Oct. 23, 2017, now U.S. Pat. No. 10,797,302 issued Oct. 6, 2020, the contents of which are hereby incorporated by reference in their entirety.

BACKGROUND

Field of the Invention

The present invention relates to a positive electrode active material for nonaqueous electrolyte secondary batteries and a production method thereof, and a nonaqueous electrolyte secondary battery using the positive electrode active material.

Description of the Related Art

In recent years, with the wide adoption of portable electronic devices such as mobile phones and laptop computers, the development of small and lightweight nonaqueous electrolyte secondary batteries having high energy density is strongly desired. Further, the development of high power secondary batteries as batteries for electric cars including hybrid cars is strongly desired.

Examples of the secondary batteries satisfying such demands include lithium ion secondary batteries. Such lithium ion secondary batteries are composed of a negative electrode, a positive electrode, an electrolyte, etc., and materials capable of intercalation and deintercalation of lithium ions are used for the active materials of the negative electrode and the positive electrode.

The lithium ion secondary batteries are now being actively studied and developed. Above all, lithium ion secondary batteries using a layered or spinel lithium-metal composite oxide as a positive electrode material allow a high voltage of 4-V class to be obtained, and therefore are being put into practical use as batteries having high energy density.

Main examples of materials proposed so far include lithium cobalt composite oxide ($LiCoO_2$) that is comparatively easily synthesized, lithium nickel composite oxide ($LiNiO_2$) using nickel that is less expensive than cobalt, lithium nickel cobalt manganese composite oxide ($LiNi_{1/3}Co_{1/3}Mn_{1/3}O_2$), and lithium manganese composite oxide ($LiMn_2O_4$) using manganese.

Among these, lithium nickel composite oxide and lithium nickel cobalt manganese composite oxide are gaining attention as a material that allows good cycle characteristics and low resistance and high power to be obtained, and a resistance reduction that is necessary for power enhancement is regarded as being important in recent years.

As a method for achieving the aforementioned resistance reduction, addition of different elements is used, and transition metals capable of having high valence such as W, Mo, Nb, Ta, and Re are considered to be useful, in particular.

For example, Japanese Patent Laid-Open No. 2009-289726 proposes a lithium transition metal compound powder for lithium secondary battery positive electrode materials containing one or more elements selected from Mo, W, Nb, Ta, and Re in an amount of 0.1 to 5 mol % with respect to the total molar amount of Mn, Ni, and Co, where the total atomic ratio of Mo, W, Nb, Ta, and Re with respect to the total of Li and the metal elements other than Mo, W, Nb, Ta, and Re on the surface portions of primary particles is preferably 5 times or more the atomic ratio of the whole primary particles.

According to this proposal, the cost reduction, high safety, high load characteristics, and improvement in powder handleability of the lithium transition metal compound powder for lithium secondary battery positive electrode materials can be achieved all together.

However, the aforementioned lithium transition metal compound powder is obtained by pulverizing a raw material in a liquid medium, spray drying a slurry in which the pulverized materials are uniformly dispersed, and firing the obtained spray-dried material. Therefore, some of different elements such as Mo, W, Nb, Ta, and Re are substituted with Ni disposed in layers, resulting in a reduction in battery characteristics such as battery capacity and cycle characteristics, which has been a problem.

Further, Japanese Patent Laid-Open No. 2005-251716 proposes a positive electrode active material for nonaqueous electrolyte secondary batteries having at least a lithium transition metal composite oxide with a layered structure, wherein the lithium transition metal composite oxide is present in the form of particles composed of either or both of primary particles and secondary particles as aggregates of the primary particles, and wherein the particles have a compound including at least one selected from the group consisting of molybdenum, vanadium, tungsten, boron, and fluorine at least on the surface.

With that, it is claimed that the positive electrode active material for nonaqueous electrolyte secondary batteries having excellent battery characteristics even in more severe use environment is obtained, and that the initial characteristics are improved without impairing the improvement in thermostability, load characteristics, and output characteristics particularly by having the compound including at least one selected from the group consisting of molybdenum, vanadium, tungsten, boron, and fluorine on the surface of the particles.

However, the effect by adding the at least one element selected from the group consisting of molybdenum, vanadium, tungsten, boron, and fluorine is to improve the initial characteristics, that is, the initial discharge capacity and the initial efficiency, where the output characteristics are not mentioned.

Further, according to the disclosed production method, the firing is performed while the additive element is mixed with a heat-treated hydroxide together with a lithium compound, and therefore the additive element is partially substituted with nickel disposed in layers to cause a reduction in battery characteristics, which has been a problem.

Further, Japanese Patent Laid-Open No. 11-16566 proposes a positive electrode active material in which the circumference of the positive electrode active material is coated with a metal containing at least one selected from Ti, Al, Sn, Bi, Cu, Si, Ga, W, Zr, B, and Mo and/or an intermetallic compound obtained by combining a plurality of these elements, and/or an oxide.

It is claimed that such coating can ensure the safety by absorbing oxygen gas, but there is no disclosure on the output characteristics. Further, the disclosed production method involves coating using a planetary ball mill, and such a coating method has the following problem: physical damage is caused on the positive electrode active material, resulting in a reduction in battery characteristics.

Further, Japanese Patent Laid-Open No. 2010-40383 proposes a positive electrode active material heat-treated while a tungstate compound is deposited on composite oxide particles mainly composed of lithium nickelate and having a carbonate ion content of 0.15 weight % or less.

According to this proposal, since the tungstate compound or a decomposition product of the tungstate compound is present on the surface of the positive electrode active material, and the oxidation activity on the surface of the composite oxide particles during charge is suppressed, gas generation due to the decomposition of the nonaqueous electrolyte or the like can be suppressed, but there is no disclosure on the output characteristics.

Further, the disclosed production method is to deposit a solution in which a sulfuric acid compound, a nitric acid compound, a boric acid compound, or a phosphate compound serving as a deposition component is dissolved in a solvent together with the tungstate compound, on the composite oxide particles that are preferably heated to at least the boiling point of the solution in which the deposition component is dissolved, where the solvent is removed within a short time, and therefore the tungsten compound is not sufficiently dispersed on the surface of the composite oxide particles and is not uniformly deposited, which has been a problem.

Further, improvements in power enhancement by lithium nickel composite oxide have also been made.

For example, Japanese Patent Laid-Open No. 2013-125732 proposes a positive electrode active material for nonaqueous electrolyte secondary batteries having fine particles containing lithium tungstate represented by any one of $Li_2WO_4$, $Li_4WO_5$, and $Li_6W_2O_9$ on the surface of a lithium-metal composite oxide composed of primary particles and secondary particles formed by aggregation of the primary particles, where high power is supposed to be obtained together with high capacity.

There are, however, increasingly demanded high capacity and high power, and further enhancements are demanded.

In view of such problems, it is an object of the present invention to provide a positive electrode active material for nonaqueous electrolyte secondary batteries which allows higher power together with high capacity to be obtained when used as a positive electrode material, while suppressing an increase in gas generation.

SUMMARY

As a result of diligent studies on the effect on the positive electrode resistance of a battery using lithium-metal composite oxide used as a positive electrode active material for nonaqueous electrolyte secondary batteries, for solving the aforementioned problems, the inventors have found that the positive electrode resistance of the battery can be reduced and output characteristics of the battery can be improved by forming a compound containing tungsten and lithium on the surface of the primary particles inside the secondary particles constituting the lithium-metal composite oxide powder, and uniformly forming the compound containing tungsten and lithium between the lithium-metal composite oxide particles.

Further, as a production method thereof, they have found that the compound containing tungsten and lithium formed on the surface of the primary particles can also be uniformly formed between the lithium-metal composite oxide particles, by immersing the lithium-metal composite oxide powder in an alkaline solution containing tungsten, followed by solid-liquid separation and heat treatment of the resultant, thereby accomplishing the present invention.

More specifically, the method for producing a positive electrode active material for nonaqueous electrolyte secondary batteries of the first aspect of the present invention includes a first step of mixing a lithium-metal composite oxide powder which is represented by the general formula: $Li_zNi_{1-x-y}Co_xM_yO_2$ (where $0 \leq x \leq 0.35$, $0 \leq y \leq 0.35$, and $0.95 \leq z \leq 1.30$ are satisfied, and M is at least one element selected from Mn, V, Mg, Mo, Nb, Ti and Al) and has a layered crystal structure constituted by primary particles and secondary particles formed by aggregation of the primary particles, to an alkaline solution with a tungsten compound dissolved therein at a tungsten concentration of 0.1 to 2 mol/L, so that the solid-liquid ratio of the lithium-metal composite oxide powder to the amount of water in the alkaline solution falls within the range of 200 to 2500 g/L, and immersing a resulting mixture, followed by solid-liquid separation, to obtain a tungsten-containing mixture in which tungsten is uniformly dispersed on the surface of the primary particles of the lithium-metal composite oxide, and a second step of subjecting the tungsten-containing mixture to heat treatment to thereby form a compound containing tungsten and lithium on the surface of the primary particles of the lithium-metal composite oxide.

The second aspect of the present invention is the method for producing a positive electrode active material for nonaqueous electrolyte secondary batteries according to the first aspect, further including a water washing step of washing the lithium-metal composite oxide powder with water, before the first step is performed.

The third aspect of the present invention is the method for producing a positive electrode active material for nonaqueous electrolyte secondary batteries according to the first and second aspects, wherein the tungsten-containing mixture contains tungsten in an amount of 3.0 at % or less with respect to the total number of atoms of Ni, Co and M contained in the lithium-metal composite oxide powder used in the mixing.

The fourth aspect of the present invention is the method for producing a positive electrode active material for nonaqueous electrolyte secondary batteries according to the first to third aspects, wherein the alkaline solution with the tungsten compound dissolved therein has a tungsten concentration of 0.05 to 2 mol/L.

The fifth aspect of the present invention is the method for producing a positive electrode active material for nonaqueous electrolyte secondary batteries according to the first to fourth aspects, wherein the alkaline solution is made by dissolving a tungsten compound in an aqueous lithium hydroxide solution.

The sixth aspect of the present invention is the method for producing a positive electrode active material for nonaqueous electrolyte secondary batteries according to the first to fifth aspects, wherein the mixing of the alkaline solution with the tungsten compound dissolved therein with the lithium-metal composite oxide powder is performed in the alkaline solution of the tungsten compound as a liquid and at a temperature of 50° C. or less.

The seventh aspect of the present invention is the method for producing a positive electrode active material for nonaqueous electrolyte secondary batteries according to the first to sixth aspects, wherein the heat treatment in the second step is performed in an oxygen atmosphere or a vacuum atmosphere at 100 to 600° C.

The eighth aspect of the present invention is a positive electrode active material for nonaqueous electrolyte secondary batteries, composed of a lithium-metal composite oxide powder having a layered crystal structure constituted by primary particles and secondary particles formed by aggregation of the primary particles and having a compound containing tungsten and lithium on the surface of the primary particles, and being represented by the general formula: $Li_zNi_{1-x-y}Co_xM_yW_aO_{2+\alpha}$ (where $0 \leq x \leq 0.35$, $0 \leq y \leq 0.35$, $0.95 \leq z \leq 1.30$, $0 < a \leq 0.03$, and $0 \leq \alpha \leq 0.15$ are satisfied, and M is at least one element selected from Mn, V, Mg, Mo, Nb, Ti and Al), wherein in observation with a scanning electron microscope for a cross section of the secondary particles of the lithium-metal composite oxide at a constant magnification, when 50 or more of the secondary particles arbitrarily sampled are observed in at least any two different observation fields of view, the number of the secondary particles having a compound containing tungsten and lithium on the surface of the primary particles inside the secondary particles accounts for 90% or more of the total number of the secondary particles observed.

The ninth aspect of the present invention is the positive electrode active material for nonaqueous electrolyte secondary batteries according to the eighth aspect, wherein the compound containing tungsten and lithium is present on the surface of the primary particles of the lithium-metal composite oxide as fine particles having a particle size of 1 to 200 nm.

The tenth aspect of the present invention is the positive electrode active material for nonaqueous electrolyte secondary batteries according to the eighth aspect, wherein the compound containing tungsten and lithium is present on the surface of the primary particles of the lithium-metal composite oxide as a coating film having a film thickness of 1 to 150 nm.

The eleventh aspect of the present invention is the positive electrode active material for nonaqueous electrolyte secondary batteries according to the eighth aspect, wherein the compound containing tungsten and lithium is present on the surface of the primary particles of the lithium-metal composite oxide in both forms of fine particles having a particle size of 1 to 200 nm and a coating film having a film thickness of 1 to 150 nm.

The twelfth aspect of the present invention is the positive electrode active material for nonaqueous electrolyte secondary batteries according to the eighth to eleventh aspects, wherein tungsten is contained in the compound containing tungsten and lithium in an amount of 0.05 to 2.0 at % in terms of the number of W atoms with respect to the total number of atoms of Ni, Co and M contained in the lithium-metal composite oxide powder.

The thirteenth aspect of the present invention is the positive electrode active material for nonaqueous electrolyte secondary batteries according to the eighth to twelfth aspects, wherein the compound containing tungsten and lithium is present in the form of lithium tungstate.

The fourteenth aspect of the present invention is a nonaqueous electrolyte secondary battery having a positive electrode including the positive electrode active material for nonaqueous electrolyte secondary batteries according to the eighth to thirteenth aspects.

According to the present invention, a positive electrode active material for nonaqueous electrolyte secondary batteries capable of achieving high power together with high capacity when used as a positive electrode material of a battery is obtained.

Further, the production method is easy and suitable for production on an industrial scale, and the industrial value thereof is exceptionally large.

DETAILED DESCRIPTION

Figure 1:
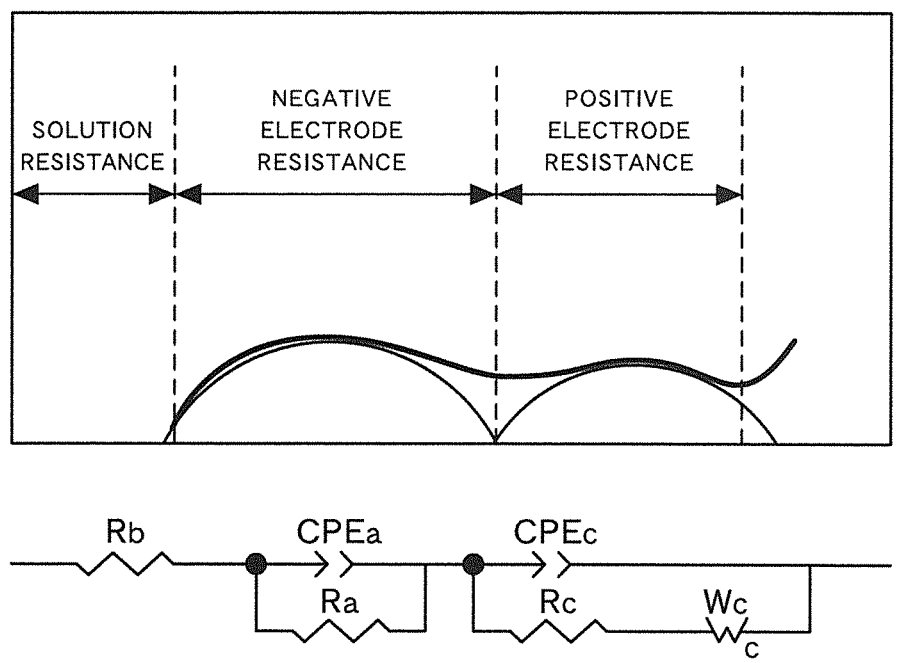
FIG. 1 is a schematic illustration of an equivalent circuit used for measurement examples of impedance evaluation and analysis.

Hereinafter, for the present invention, a positive electrode active material of the present invention will be first described, and thereafter a production method thereof and a nonaqueous electrolyte secondary battery using the positive electrode active material of the present invention will be described.

(1) Positive Electrode Active Material

The positive electrode active material of the present invention for nonaqueous electrolyte secondary batteries includes a lithium-metal composite oxide which is composed of primary particles and secondary particles formed by aggregation of the primary particles (which may be hereinafter referred to simply as "secondary particles"), which has the layered crystal structure, and which has a compound containing tungsten and lithium on the surface of the primary particles, the composition of the positive electrode active material is represented by the general formula: $Li_zNi_{1-x-y}Co_xM_yW_aO_{2+\alpha}$ (where $0 \leq x \leq 0.35$, $0 \leq y \leq 0.35$, $0.95 \leq z \leq 1.30$, $0 < a \leq 0.03$, and $0 \leq \alpha \leq 0.15$ are satisfied, and M is at least one element selected from Mn, V, Mg, Mo, Nb, Ti and Al), and when a cross section of the secondary particles of the lithium-metal composite oxide is observed by a scanning electron microscope by observing any 50 or more of the secondary particles, the number of secondary particles having a compound containing tungsten (W) and lithium (Li) on the surface of the primary particles inside the secondary particles is 90% or more with respect to the number of the particles observed.

More specifically, a lithium-metal composite oxide whose composition is represented by the general formula: $Li_zNi_{1-x-y}Co_xM_yO_2$ (where $0 \leq x \leq 0.35$, $0 \leq y \leq 0.35$, and $0.95 \leq z \leq 1.30$ are satisfied, and M is at least one element selected from Mn, V, Mg, Mo, Nb, Ti and Al) and which has the layered crystal structure is used as a base material, thereby allowing high charge-discharge capacity to be obtained. For allowing higher charge-discharge capacity to be obtained, $x+y \leq 0.2$ and $0.95 \leq z \leq 1.10$ are preferably satisfied in the general formula.

Further, the base material is in the form of a lithium-metal composite oxide powder constituted by primary particles and secondary particles formed by aggregation of the primary particles (hereinafter, the secondary particles and the primary particles existing alone may be referred to collectively as "lithium-metal composite oxide particles"), and a compound containing tungsten (W) and lithium (Li) (which may be hereinafter referred to as "LW compound") is formed on the surface of the primary particles, thereby improving the output characteristics while maintaining the charge-discharge capacity.

Generally, when the surface of the positive electrode active material is completely coated with a different compound, the movement (intercalation) of lithium ions is significantly limited, and therefore high capacity that is an advantage of lithium nickel composite oxide is eventually offset.

In contrast, in the present invention, LW compound is formed on the surface of the lithium-metal composite oxide particles and the surface of the primary particles thereinside, and the LW compound has high lithium ion conductivity and has an effect of promoting the movement of lithium ions. Therefore, the LW compound is formed on the surface of the lithium-metal composite oxide particles and the surface of the primary particles thereinside, thereby forming Li conduction paths at the interface with the electrolyte, so that the reaction resistance of the positive electrode active material (which may be hereinafter referred to as "positive electrode resistance") is reduced to improve the output characteristics of the nonaqueous electrolyte secondary battery.

Thus, the reduction in positive electrode resistance reduces the voltage to be lost in the nonaqueous electrolyte secondary battery (which may be hereinafter referred to simply as "battery"), and the voltage actually applied to the load side is relatively increased, thereby allowing high power to be obtained. Further, the increase in the voltage applied to the load side allows lithium to be sufficiently inserted into and removed from the positive electrode, and therefore the charge-discharge capacity (which may be hereinafter referred to as "battery capacity") is also improved.

The contact with the electrolyte in use as the positive electrode active material of the battery occurs on the surface of the primary particles, and therefore it is important that the lithium tungstate be formed on the surface of the primary particles. Here, the surface of the primary particles in the present invention includes the surface of the primary particles exposed on the outer surface of the secondary particles, the surface of the primary particles communicating with the outside of the secondary particles so as to allow the electrolyte to penetrate therethrough and exposed into voids in the vicinity of the surface of the secondary particles and inside thereof, and further the surface of the primary particles present singly. Further, the surface of the primary particles includes even the grain boundaries between the primary particles if the primary particles are not perfectly bonded, and the electrolyte can penetrate therethrough.

The contact with the electrolyte occurs not only on the outer surface of the secondary particles formed by aggregation of the primary particles but also in the voids between the primary particles in the vicinity of the surface of the secondary particles and inside thereof and further at the imperfect grain boundaries, and therefore it is necessary to form LW compound also on the surface of the primary particles to promote the movement of lithium ions. Accordingly, the reaction resistance of the lithium-metal composite oxide particle can be further reduced by forming LW compound on many of the surfaces of the primary particles which can contact with the electrolyte.

Further, as the form of LW compound on the surface of the primary particles, when the surface of the primary particles is coated with layered materials, the contact area with the electrolyte is reduced. When such layered materials are formed, the formation of the compound tends to concentrate on the surface of some specific primary particles. Accordingly, since the layered materials as coating materials have high lithium ion conductivity, the effects of improving the charge-discharge capacity and reducing the reaction resistance are obtained, but they are not sufficient, leaving room for improvement.

Accordingly, for obtaining higher effect, LW compound is preferably present on the surface of the primary particles of the lithium-metal composite oxide as fine particles having a particle size of 1 to 200 nm.

The contact area with the electrolyte is rendered sufficient by having such a form, so that the lithium ion conductivity can be effectively improved, thereby allowing the positive electrode resistance to be more effectively reduced and the charge-discharge capacity to be improved. When the particle size is less than 1 nm, the fine particles may fail to have sufficient lithium ion conductivity in some cases. Further, when the particle size is over 200 nm, the formation of the fine particles on the surface is made non-uniform, which may result in failure to obtain a higher effect of reducing the positive electrode resistance in some cases.

Here, the fine particles are not necessarily completely formed on all surfaces of the primary particles and may be scattered. Even when scattered, the effect of reducing the positive electrode resistance is obtained as long as the fine particles are formed on the outer surface of the lithium-metal composite oxide particles and the surface of the primary particles exposed to voids thereinside. Further, not all of the fine particles are necessarily present as fine particles having a particle size of 1 to 200 nm, and a high effect is obtained when 50% or more of the number of the fine particles formed on the surface of the primary particles are preferably formed to have a particle size in the range of 1 to 200 nm.

Meanwhile, when the surface of the primary particles is coated with a thin film, Li conduction paths can be formed at the interface with the electrolyte, while the reduction in specific surface area is suppressed, and higher effects of improving the battery capacity and reducing the positive electrode resistance are obtained. In the case where the surface of the primary particles are coated with LW compound in the form of thin films as above, LW compound is preferably present on the surface of the primary particles of the lithium-metal composite oxide as coating films with a film thickness of 1 to 150 nm.

When the film thickness is less than 1 nm, the coating films may fail to have sufficient lithium ion conductivity in some cases. Further, when the film thickness is over 150 nm, the lithium ion conductivity is reduced, which may result in failure to obtain a higher effect of reducing the positive electrode resistance in some cases.

However, such coating film may be partially formed on the surface of the primary particles, and the whole coating film does not need to have a film thickness in the range of 1 to 150 nm. When the coating film with a film thickness of 1 to 150 nm is formed at least partially on the surface of the primary particles, a high effect is obtained.

Further, also in the case where a compound is formed on the surface of the primary particles is the form of fine particles as well as in the form of a coating thin film, a high effect on the battery characteristics is obtained.

Further, when the LW compound is formed on the surface of the primary particles, the effects of suppressing production of excess lithium on the surface of the lithium-metal composite oxide and also suppressing gas generation from the surface of the positive electrode material are also obtained. The amount of excess lithium is preferably 0.05 mass % or less, more preferably 0.035 mass % or less with respect to the total amount of the positive electrode active material.

Meanwhile, in the case where the LW compound is non-uniformly formed between the lithium-metal composite oxide particles, the movement of lithium ions between the lithium-metal composite oxide particles is rendered non-uniform, and therefore a load is applied onto some specific lithium-metal composite oxide particles, which tends to cause a deterioration in cycle characteristics and an increase in reaction resistance. In particular, in the case of secondary particles where no LW compound is formed on the surface of the primary particles inside the secondary particles, even when fine particles are formed on the surface of the secondary particles, a load is easily applied and degradation easily occurs as compared with the case of secondary particles where the LW compound is formed also on the surface of the primary particles inside.

Accordingly, secondary particles where no LW compound is formed on the surface of the primary particles inside the secondary particles are decreased, and thus a reduction in positive electrode resistance and enhancements in output characteristics and battery capacity can be achieved and also good cycle characteristics can be achieved.

Specifically, when the cross section of the lithium-metal composite oxide particles is observed by a scanning electron microscope by observing any 50 or more of the secondary particles, the ratio of secondary particles having the LW compound on the surface of the primary particles inside the secondary particles can be set to 90% or more, preferably 95% or more with respect to the number of the particles observed, thereby resulting in enhancement in battery characteristics as described above.

Such scanning electron microscope observation is performed by, for example, embedding a lithium-metal composite oxide particle, namely, a positive electrode active material powder into a resin for processing so that the cross section of the particle can be observed, and thereafter observing the cross section of 50 or more in total of the secondary particles in at least two different observation fields of view by a field emission scanning electron microscope at a constant magnification of 5000-fold, and 50 or more of the secondary particles can be observed to thereby eliminate any observation error and to accurately determine a positive electrode active material having the effect due to the formation of the LW compound inside the secondary particles.

The LW compound is not limited as long as it contains W and Li, but is preferably in the form of lithium tungstate.

Such lithium tungstate is formed, thereby further increasing lithium ion conductivity and enhancing the effect of reducing the reaction resistance. Further, the lithium tungstate preferably includes one or more compounds selected from the group consisting of $Li_2WO_4$, $Li_4WO_5$, $Li_6W_2O_9$, $Li_6WO_6$, and $7(Li_2WO_4).4H_2O$ in terms of lithium ion conductivity, and is preferably $Li_2WO_4$ or $Li_4WO_5$, or a mixture thereof.

The amount of tungsten contained in the LW compound is 3.0 at % or less, preferably 0.05 to 3.0 at %, more preferably 0.05 to 2.0 at %, further preferably 0.08 to 1.0 at %, with respect to the total number of atoms of Ni, Co and M contained in the lithium-metal composite oxide. When the amount of tungsten added is 3.0 at % or less, the effect of improving output characteristics is obtained. Further, when the amount is 0.05 to 2.0 at %, the amount of formation of LWO can be an amount that is sufficient for reducing the positive electrode resistance, and can also be an amount that can sufficiently ensure the surface of the primary particles which can contact with the electrolyte, and both higher battery capacity and higher output characteristics can be achieved.

When the amount of tungsten is less than 0.05 at %, the effect of improving the output characteristics may fail to be sufficiently obtained, and when the amount of tungsten is over 3.0 at %, the amount of the LW compound formed excessively increases to inhibit the conduction of lithium between the lithium-metal composite oxide particles and the electrolyte, which may result in a reduction in battery capacity.

The amount of lithium contained in the LW compound is not specifically limited, and the effect of enhancing the lithium ion conductivity is obtained as long as lithium is contained in the LW compound. Although excess lithium is usually present on the surface of the lithium-metal composite oxide particles and the amount of lithium may also be an amount to be supplied to the LW compound by such excess lithium in mixing with the alkaline solution, the amount is preferably an amount sufficient for forming lithium tungstate.

Further, the amount of lithium in the entire positive electrode active material, where the atomic ratio "Li/Me" of the number of atoms of Li with respect to the sum of the number of atoms of Ni, Co, and Mo in the positive electrode active material (Me) is 0.95 to 1.30, preferably 0.97 to 1.25, more preferably 0.97 to 1.20. Thus, the ratio Li/Me in the lithium-metal composite oxide particles as a core material is set to 0.95 to 1.25, more preferably 0.95 to 1.20, thereby allowing high battery capacity to be obtained and allowing the amount of lithium that is sufficient to form a LW compound to be ensured. For obtaining higher battery capacity, the ratio Li/Me in the entire positive electrode active material is set to 0.95 to 1.15, and the ratio Li/Me in the lithium-metal composite oxide particles is further preferably set to 0.95 to 1.10. Here, the core material is the lithium-metal composite oxide particles excluding the LW compound, and the positive electrode active material is obtained therefrom by forming the LW compound on the surface of the primary particles of the lithium-metal composite oxide particles.

When the ratio Li/Me is less than 0.95, the reaction resistance of the positive electrode in the nonaqueous electrolyte secondary battery using the obtained positive electrode active material increases, and thus the output of the battery decreases. Further, when the ratio Li/Me is over 1.30, the initial discharge capacity of the positive electrode active material decreases, and the reaction resistance of the positive electrode increases as well.

The positive electrode active material of the present invention has improved output characteristics by forming an LW compound on the surface of the primary particles of the lithium-metal composite oxide, and the powder characteristics as the positive electrode active material such as particle size and tap density may fall within the range of those of commonly used positive electrode active materials.

The effect by attachment of the LW compound to the surface of the primary particles of the lithium-metal composite oxide can be applied to, for example, lithium-cobalt-based composite oxide, lithium-manganese-based composite oxide and lithium-nickel-cobalt-manganese-based composite oxide powders, and further a positive electrode active material for lithium secondary batteries, which is used as not only the positive electrode active material of the present invention, but also one generally used.

(2) Method for Producing Positive Electrode Active Material

Hereinafter, a method for producing the positive electrode active material for nonaqueous electrolyte secondary batteries of the present invention will be described in detail for each step.

[First Step]

The first step is a step of obtaining a tungsten-containing mixture by immersing a lithium-metal composite oxide powder constituted by primary particles and secondary particles formed by aggregation of the primary particles in an alkaline solution of a tungsten compound (hereinafter, the alkaline solution of a tungsten compound will be referred to as "alkaline solution (W)"), followed by solid-liquid separation.

The step can uniformly disperse W into the surface of the primary particles inside the secondary particles.

Here, it is necessary to mix and immerse the lithium-metal composite oxide powder into the alkaline solution (W) so that the solid-liquid ratio of the lithium-metal composite oxide powder with respect to the amount of water in the alkaline solution (W) falls within the range of 200 to 2500 g/L, preferably 500 to 2000 g/L. Further, the W concentration in the alkaline solution (W) is set to 0.1 to 2 mol/L, preferably 0.1 to 1.5 mol/L.

In the first step, the lithium-metal composite oxide powder is immersed in the alkaline solution (W), thereby enabling the alkaline solution (W) to penetrate into the surface of the primary particles inside the secondary particles at a proper concentration, and W to be dispersed on the surface of the primary particles in an amount that allows the LW compound to be formed. Further, the amount of W contained in the tungsten-containing mixture is determined by the amount of W in the alkaline solution (W) remaining in the lithium-metal composite oxide powder after solid-liquid separation.

More specifically, in the first step, since solid-liquid separation is performed after immersion in the alkaline solution (W) and therefore the W content contained in the alkaline solution (W) remaining the tungsten-containing mixture after solid-liquid separation is dispersed in and attached onto the surface of the secondary particles and the surface of the primary particles of the lithium-metal composite oxide, the amount necessary for forming the compound can be determined from the water content after solid-liquid separation.

Accordingly, the amount of W contained in the tungsten-containing mixture can be controlled by the W concentration in the alkaline solution (W) and the degree of solid-liquid separation. In a solid-liquid separation method commonly performed, since the amount of a liquid remaining after solid-liquid separation is 5 to 15 mass % with respect to a cake obtained by solid-liquid separation and is stable depending on solid-liquid separation conditions, the amount can be easily controlled as long as the amount of a liquid (water content) remaining is determined by a preliminary test or the like.

The amount of W contained in the tungsten-containing mixture is equal to the amount of tungsten contained in the compound in the obtained positive electrode active material. Accordingly, the amount of W contained in the tungsten-containing mixture is preferably 3.0 at % or less, more preferably 0.05 to 3.0 at %, further preferably 0.05 to 2.0 at %, particularly preferably 0.08 to 1.0 at % with respect to the total number of atoms of Ni, Co and M contained in the lithium-metal composite oxide powder mixed.

In the case where deagglomeration of the lithium-metal composite oxide powder is performed after the heat treatment as the subsequent step, the compound containing W and Li formed on the surface of the secondary particles may be peeled and the tungsten content of the obtained positive electrode active material may be reduced. In such a case, the amount of tungsten to be dissolved in the alkaline solution may be determined in expectation of the amount decreased, namely, 5 to 20 at % with respect to the amount of tungsten to be added.

In the first step, while the solid-liquid ratio is controlled to fall within the range of 200 to 2500 g/L, the amount of Li eluted from the lithium-metal composite oxide is so large at a solid-liquid ratio of less than 200 g/L that characteristics of a battery obtained using the obtained positive electrode active material are deteriorated. When the solid-liquid ratio is over 2500 g/L, the alkaline solution (W) cannot be uniformly mixed with the tungsten-containing mixture, and secondary particles where the alkaline solution (W) does not penetrate into the surface of the primary particles inside the secondary particles are increased.

The W concentration in the alkaline solution (W) is set to 0.1 to 2 mol/L. When the W concentration in the alkaline solution (W) is less than 0.1 mol/L, the amount of W contained in the tungsten-containing mixture is decreased, and characteristics of a battery obtained using the obtained positive electrode active material are not improved. Further, even when the amount of W contained in the tungsten-containing mixture is increased by an increase in the amount of a liquid remaining after solid-liquid separation, the alkaline solution (W) remaining in the tungsten-containing mixture is eccentrically located and therefore the variation in amount of W contained is increased between the lithium-metal composite oxide particles, thereby increasing secondary particles where the LW compound is not formed on the surface of the primary particles inside the secondary particles. When the W concentration in the alkaline solution (W) is over 2 mol/L, the amount of W contained in the tungsten-containing mixture is so large that characteristics of a battery obtained using the obtained positive electrode active material are deteriorated.

In the first step, the tungsten compound is first dissolved in the alkaline solution. The dissolution method may be a common powder dissolution method, and for example, the tungsten compound may be added and dissolved with stirring of a solution by use of a reaction tank with which a stirring apparatus is equipped. The tungsten compound is preferably completely dissolved in the alkaline solution in terms of dispersion uniformity.

The tungsten compound may be soluble in the alkaline solution, and a tungsten compound easily soluble in alkali, such as tungsten oxide, lithium tungstate, or ammonium tungstate is preferably used.

As the alkali for use in the alkaline solution (W), a common alkaline solution not containing any contamination harmful to the positive electrode active material is used, for obtaining high charge-discharge capacity. While ammonia or lithium hydroxide which may not cause incorporation of contamination can be used, lithium hydroxide is preferably used from the viewpoint of not inhibiting intercalation of Li.

In the case where lithium hydroxide is used, the amount of lithium contained in the positive electrode active material after mixing is needed to fall within the above range of the general formula: Li/Me, and the amount of lithium hydroxide with respect to W on an atomic ratio is preferably 3.5 to 10.0, more preferably 3.5 or more and less than 4.5. While Li is supplied by elution from the lithium-metal composite oxide, lithium hydroxide is used within the range to thereby enable a sufficient amount of Li for forming the LW compound to be supplied.

The alkaline solution (W) is preferably an aqueous solution.

W is needed to penetrate also into the voids inside the secondary particles and the imperfect grain boundaries for dispersing W in the entire surface of the primary particles, and any solvent that can sufficiently penetrate into the secondary particles may be used, but use of a highly volatile solvent such as alcohol is not desirable in terms of cost because the loss due to volatilization is large. Further, contaminations present on the surfaces of the secondary particles and the primary particles are often water-soluble, and an aqueous solution is preferably used also from the viewpoint that such contaminations are removed to enhance characteristics of the positive electrode active material.

The pH of the alkaline solution may be any pH as long as the tungsten compound is dissolved, and the pH is preferably 9 to 12. When the pH is less than 9, the amount of lithium eluted from the lithium-metal composite oxide is so large that battery characteristics may be deteriorated. When the pH is over 12, the amount of excess alkali remaining in the lithium-metal composite oxide is so large that battery characteristics may be deteriorated.

With respect to the lithium-metal composite oxide particles serving as a core material of the obtained positive electrode active material in the production method of the present invention, a lithium-metal composite oxide, the composition of which is known and represented by the general formula: $Li_zNi_{1-x-y}Co_xM_yO_2$ (where $0 \leq x \leq 0.35$, $0 \leq y \leq 0.35$, and $0.95 \leq z \leq 1.30$ are satisfied, and M is at least one element selected from Mn, V, Mg, Mo, Nb, Ti and Al), is used as the lithium-metal composite oxide as a base material from the viewpoints of high capacity and low reaction resistance, because the lithium content is eluted into the alkaline solution (W) from the lithium-metal composite oxide as a base material, namely, the lithium-metal composite oxide powder to be mixed with the alkaline solution (W).

More specifically, z defined as the Li/Me of the base material satisfies $0.95 \leq z \leq 1.30$, preferably $0.97 \leq z \leq 1.25$, more preferably $0.97 \leq z \leq 1.20$, further preferably $0.97 \leq z \leq 1.15$, thereby enabling high battery capacity and low reaction resistance to be achieved with the amount of lithium in the lithium-metal composite oxide particles serving as a core material being controlled to a proper amount even after washing.

Further, since it is advantageous to increase the contact area with the electrolyte for improving the output characteristics, it is preferable to use a lithium-metal composite oxide powder which is constituted by primary particles and secondary particles formed by aggregation of the primary particles and which has voids and grain boundaries through which the electrolyte can penetrate in the secondary particles.

Next, the lithium-metal composite oxide powder is added, mixed and immersed while the prepared alkaline solution (W) is stirred. When the tungsten compound is easily soluble, the lithium-metal composite oxide powder may be mixed with a solvent such as water and thus formed into a slurry, and thereafter the tungsten compound may be added thereto, dissolved and immersed therein. Further, the alkaline solution (W) can also be circulated, and supplied to and immersed in the lithium-metal composite oxide powder.

More specifically, the alkaline solution (W) may be allowed to flow between the lithium-metal composite oxide particles and to penetrate into the secondary particles.

The mixing is preferably performed at a temperature of 50° C. or less. The mixing is performed at a temperature of 50° C. or less, thereby enabling excess Li to be inhibited from being eluted from the lithium-metal composite oxide particles.

The lithium-metal composite oxide powder may be mixed with the alkaline solution (W) so that the alkaline solution (W) is allowed to penetrate into the secondary particles, and a stirring reaction tank or the like can be used in the case of the slurry.

In the case where the solid-liquid ratio is high and such mixing is not sufficiently made in a stirring reaction tank, the lithium-metal composite oxide powder may be mixed with the alkaline solution (W) sufficiently to an extent such that the shape thereof is not broken, using a mixer such as a shaker mixer, a Loedige mixer, a Julia mixer, or a V blender. Thus, W in the alkaline solution (W) can be uniformly distributed into the surface of the primary particles of the lithium-metal composite oxide.

Immersion is performed in the alkaline solution (W), followed by solid-liquid separation, to obtain the tungsten-containing mixture. Such solid-liquid separation may be made by an apparatus commonly used, and a suction filtering machine, a centrifuge, a filter press or the like is used.

In the production method of the present invention, the lithium-metal composite oxide powder as a base material can be further washed with water before the first step, for enhancing the battery capacity and the safety of the positive electrode active material.

The water washing may be performed by a known method in known conditions, and may be performed to an extent such that battery characteristics are not deteriorated due to excess lithium eluted from the lithium-metal composite oxide powder. In the water washing, the mixing with the alkaline solution (W) may be made by any method of mixing after drying or of mixing by only solid-liquid separation without drying.

In the case of only solid-liquid separation, the tungsten concentration after immersion in the alkaline solution (W) is lowered by water contained in the lithium-metal composite oxide powder, and therefore the concentration in the alkaline solution (W) for immersion may be calculated in advance in consideration of the amount of water remaining after solid-liquid separation. Further, the lithium-metal composite oxide powder can be subjected to water washing by use of the alkaline solution (W) to perform water washing and immersion in the alkaline solution (W) at the same time, and thereafter subjected to solid-liquid separation.

[Second Step]

The second step is a step of heat-treating the tungsten-containing mixture. Thus, the LW compound is formed from W supplied from the alkaline solution (W), and the alkaline solution (W), or Li supplied by elution of lithium from the lithium-metal composite oxide, to obtain the positive electrode active material for nonaqueous electrolyte secondary batteries, including the LW compound on the surface of the primary particles of the lithium-metal composite oxide.

The heat treatment method is not specifically limited, but the heat treatment is preferably performed at a temperature of 100 to 600° C. in an oxygen atmosphere or a vacuum atmosphere for preventing the deterioration in electrical properties in use as a positive electrode active material for nonaqueous electrolyte secondary batteries.

When the heat treatment temperature is less than 100° C., the water is not sufficiently evaporated, which may result in failure to sufficiently form the LW compound. Meanwhile, when the heat treatment temperature exceeds 600° C., the lithium-metal composite oxide particles are fired, and W partially forms a solid solution in the layered structure of the lithium-metal composite oxide, which may reduce the charge-discharge capacity of the battery.

The atmosphere in the heat treatment is preferably an oxidizing atmosphere such as an oxygen atmosphere or a vacuum atmosphere for avoiding a reaction with water and carbonic acid in the atmosphere.

The heat treatment time is not specifically limited, but is preferably 5 to 15 hours for sufficiently evaporating the water in the alkali solution (W) to form fine particles.

(3) Nonaqueous Electrolyte Secondary Battery

The nonaqueous electrolyte secondary battery of the present invention is constituted by a positive electrode, a negative electrode, a nonaqueous electrolyte, etc., and constituted by the same components as those of common nonaqueous electrolyte secondary batteries. The embodiment described below is just an example, and the nonaqueous electrolyte secondary battery of the present invention can be implemented by employing embodiments in which various changes and improvements are made, using the embodiment shown in this description as a base, based on the knowledge of those skilled in the art. Further, the applications of the nonaqueous electrolyte secondary battery of the present invention are not specifically limited.

(a) Positive Electrode

Using the positive electrode active material for nonaqueous electrolyte secondary batteries described above, the positive electrode of the nonaqueous electrolyte secondary battery is produced, for example, as follows.

First, a positive electrode active material in powder form, a conductive material, and a binder are mixed, and activated carbon and a solvent for its intended purpose such as a viscosity adjuster are further added, as needed, and the mixture is kneaded to produce a positive electrode composite material paste.

The mixing ratio of each component in the positive electrode composite material paste is also an important element to determine the performance of the nonaqueous electrolyte secondary battery. When the total mass of the solid contents of the positive electrode composite material excluding the solvent is taken as 100 parts by mass, it is desirable that the content of the positive electrode active material be 60 to 95 parts by mass, the content of the conductive material be 1 to 20 parts by mass, and the content of the binder be 1 to 20 parts by mass, as in a positive electrode of a common nonaqueous electrolyte secondary battery.

The obtained positive electrode composite material paste, for example, is applied to the surface of a current collector made of aluminum foil, followed by drying, to disperse the solvent. In order to enhance the electrode density, it may be pressed by roll pressing or the like, as needed. Thus, a positive electrode in sheet form can be produced. The positive electrode in sheet form can be used for producing a battery, for example, by being cut into a suitable size corresponding to the intended battery. However, the method for producing the positive electrode is not limited to the aforementioned example, and another method may be employed.

For producing the positive electrode, graphite (such as natural graphite, artificial graphite, and expanded graphite) and carbon black materials such as acetylene black and Ketjen Black®, for example, can be used as the conductive material.

The binder serves to hold the active material particles, for which polyvinylidene fluoride (PVDF), polytetrafluoroethylene (PTFE), fluororubber, ethylene propylene diene rubber, styrene butadiene, cellulose resins, and polyacrylic acid, for example, can be used.

As needed, the positive electrode active material, the conductive material, and the activated carbon are dispersed, and a solvent to dissolve the binder is added to the positive electrode composite material. Specifically, an organic solvent such as N-methyl-2-pyrrolidone can be used as the solvent. Further, activated carbon can be added to the positive electrode composite material for an increase in electric double layer capacity.

(b) Negative Electrode

As the negative electrode, a material formed by applying a negative electrode composite material formed into a paste by mixing the binder with metal lithium, lithium alloy, or the like, or a negative electrode active material capable of absorbing and desorbing lithium ions and adding a suitable solvent onto the surface of the current collector made of a metal foil such as copper, followed by drying and compressing for increasing the electrode density, as needed, is used.

As the negative electrode active material, a powder material of natural graphite, artificial graphite, a fired material of an organic compound such as a phenolic resin, and a carbon material such as cokes, for example, can be used. In this case, a fluorine-containing resin such as PVDF can be used as the negative electrode binder, as in the positive electrode, and an organic solvent such as N-methyl-2-pyrrolidone can be used as the solvent to disperse the active material and the binder therein.

(c) Separator

A separator is interposed between the positive electrode and the negative electrode. The separator separates the positive electrode and the negative electrode from each other and holds the electrolyte. A thin film of polyethylene, polypropylene, or the like having a large number of fine holes can be used as the separator.

(d) Nonaqueous Electrolyte

The nonaqueous electrolyte is formed by dissolving a lithium salt as a supporting salt in an organic solvent.

As the organic solvent, one selected from cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butanesulton, and phosphorus compounds such as triethyl phosphate and trioctyl phosphate can be used alone, or two or more of these can be mixed for use.

As the supporting salt, $LiPF_6$, $LiBF_4$, $LiClO_4$, $LiAsF_6$, and $LiN(CF_3SO_2)_2$, and composite salts of these can be used.

Further, the nonaqueous electrolyte may contain a radical scavenger, a surfactant, a flame retardant, and the like.

(e) Shape and Configuration of Battery

The nonaqueous electrolyte secondary battery of the present invention constituted by the positive electrode, the negative electrode, the separator, and the nonaqueous electrolyte described as above can have various shapes such as a cylindrical type and a stacked type.

Even if any shape is employed, an electrode body is obtained by stacking the positive electrode and the negative electrode via the separator, the obtained electrode body is impregnated with the nonaqueous electrolyte, the connection between the positive electrode current collector and the positive electrode terminal connected to the outside and the connection between the negative electrode current collector and the negative electrode terminal connected to the outside are established using leads for the current collectors, and the components are sealed in a battery case, to complete the nonaqueous electrolyte secondary battery.

(f) Characteristics

The nonaqueous electrolyte secondary battery using the positive electrode active material of the present invention has high capacity and high power.

In particular, the nonaqueous electrolyte secondary battery obtained by a further preferable embodiment using the positive electrode active material according to the present invention, for example, when used as a positive electrode of a 2032-type coin battery, has a high initial discharge capacity of 165 mAh/g or more and a low positive electrode resistance and further has high capacity and high power. Further, it also has high thermostability and excellent safety.

Here, the method for measuring the positive electrode resistance in the present invention is exemplified as follows. when the frequency dependence of a battery reaction is measured by a common AC impedance method as an electrochemical evaluation technique, a Nyquist diagram based on the solution resistance, the negative electrode resistance and the negative electrode capacity, and the positive electrode resistance and the positive electrode capacity is obtained as shown in FIG. 1.

The battery reaction in an electrode is made by the resistance components following charge transfers and the capacity components by an electric double layer. When these components are shown as an electrical circuit, a parallel circuit of the resistance and the capacity is obtained, and they are shown as an equivalent circuit in which the solution resistance and the parallel circuit of the negative electrode and the positive electrode are connected in series as the entire battery.

The Nyquist diagram determined is subjected to fitting calculation using the equivalent circuit, and the resistance components and the capacity components each can be estimated. The positive electrode resistance is equal to the diameter of a semicircle on the low frequency side of the Nyquist diagram to be obtained.

From above, the positive electrode resistance can be estimated by performing the AC impedance measurement on the produced positive electrode and subjecting the obtained Nyquist diagram to fitting calculation using the equivalent circuit.

EXAMPLES

For a secondary battery having a positive electrode using the positive electrode active material obtained by the present invention, the performance (such as initial discharge capacity and positive electrode resistance) was measured.

Hereinafter, the present invention will be specifically described by way of examples, but the present invention is not limited to these examples at all.

(Production and Evaluation of Battery)

For evaluating the positive electrode active material, a 2032-type coin battery 1 (which will be hereinafter referred to as coin type battery) shown in FIG. 3 was used.

Figure 3:
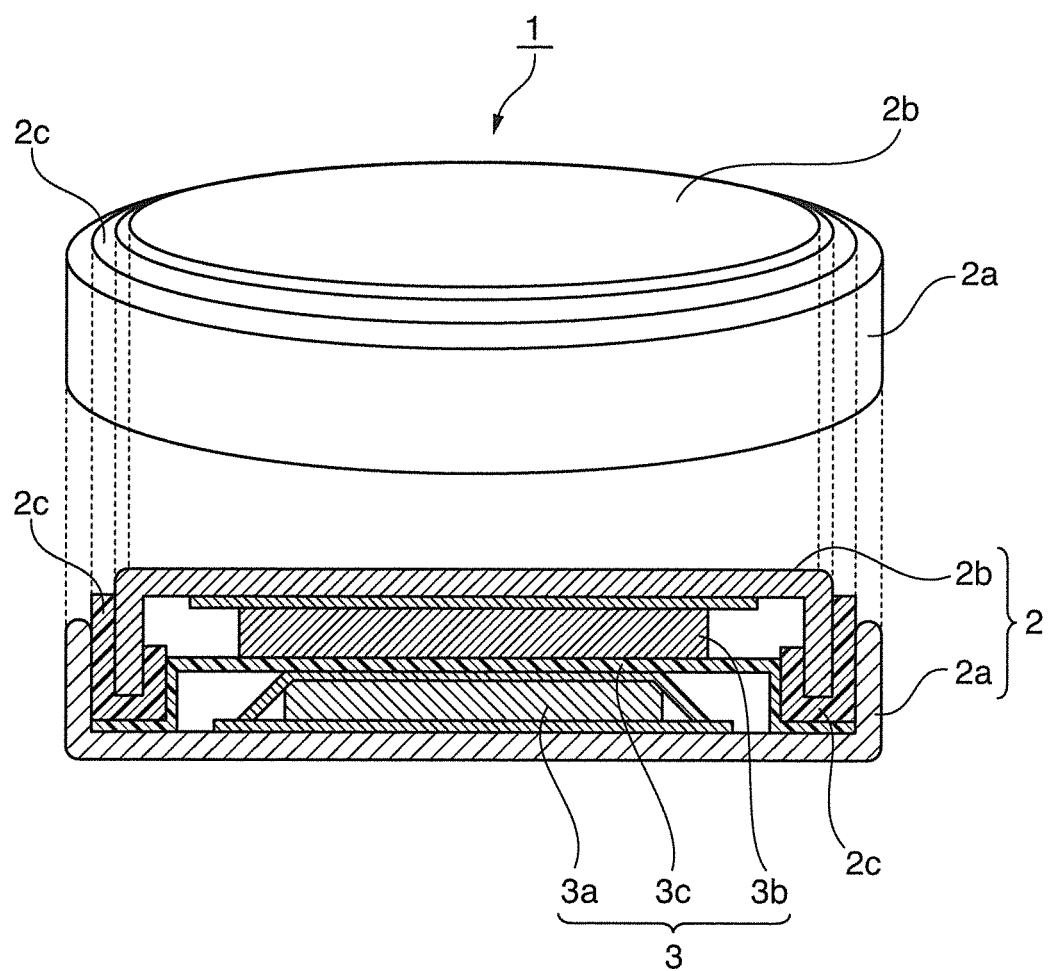
FIG. 3 is a schematic sectional view of a coin type battery 1 used for battery evaluation.

As shown in FIG. 3, the coin type battery 1 is constituted by a case 2 and electrodes 3 housed in the case 2.

The case 2 has a hollow positive electrode can 2a with one end open and a negative electrode can 2b arranged in the opening of the positive electrode can 2a, and is configured so that, when the negative electrode can 2b is arranged in the opening of the positive electrode can 2a, a space to house the electrodes 3 is formed between the negative electrode can 2b and the positive electrode can 2a.

The electrodes 3 are constituted by a positive electrode 3a, a separator 3c, and a negative electrode 3b, which are stacked to be aligned in this order and are housed in the case 2 so that the positive electrode 3a is in contact with the inner surface of the positive electrode can 2a, and the negative electrode 3b is in contact with the inner surface of the negative electrode can 2b.

The case 2 includes a gasket 2c, and the relative movement between the positive electrode can 2a and the negative electrode can 2b is fixed by the gasket 2c so that the non-contact state is maintained. Further, the gasket 2c also has a function of sealing the gap between the positive electrode can 2a and the negative electrode can 2b so as to block between the inside and the outside of the case 2 air-tightly and liquid-tightly.

The coin type battery 1 shown in the FIG. 3 was fabricated as follows.

First, 52.5 mg of the positive electrode active material for nonaqueous electrolyte secondary batteries, 15 mg of acetylene black, and 7.5 mg of polytetrafluoroethylene resin (PTFE) were mixed, followed by press molding at a pressure of 100 MPa to a diameter of 11 mm and a thickness of 100 μm, to produce the positive electrode 3a. The thus produced positive electrode 3a was dried in a vacuum dryer at 120° C. for 12 hours.

Using the positive electrode 3a, the negative electrode 3b, the separator 3c, and the electrolyte, the coin type battery 1 described above was produced in a glove box under Ar atmosphere with the dew point controlled to −80° C.

As the negative electrode 3b, a negative electrode sheet in which graphite powder with an average particle size of about 20 μm and polyvinylidene fluoride were applied to a copper foil and which was punched into a disk shape with a diameter of 14 mm was used.

As the separator 3c, a polyethylene porous film with a film thickness of 25 μm was used. As the electrolyte, an equal mixture (manufactured by TOMIYAMA PURE CHEMICAL INDUSTRIES, LTD.) of ethylene carbonate (EC) and diethyl carbonate (DEC) with 1 M $LiClO_4$ serving as a supporting electrolyte was used.

The initial discharge capacity and the positive electrode resistance showing the performance of the thus produced coin type battery 1 were evaluated as follows.

The battery capacity was evaluated by the initial discharge capacity. The capacity when the coin type battery 1 allowed to stand for about 24 hours from the fabrication was charged, with the current density with respect to the positive electrode set to 0.1 $mA/cm^2$, to a cut-off voltage of 4.3 V after the OCV (Open Circuit Voltage) became stable, followed by a pause for one hour, and was discharged to a cut-off voltage of 3.0 V was taken as the initial discharge capacity.

Further, the Nyquist plot shown in FIG. 1 is obtained by charging the coin type battery 1 at a charge potential of 4.1 V and measuring the positive electrode resistance using a frequency response analyzer and a potentio-galvanostat (1255B, manufactured by Solartron) by the AC impedance method.

Since the Nyquist plot is shown as the sum of characteristic curves showing the solution resistance, the negative electrode resistance and the capacity thereof, and the positive electrode resistance and the capacity thereof, fitting calculation was performed based on the Nyquist plot using the equivalent circuit to calculate the value of the positive electrode resistance.

In the present examples, for producing the composite oxide, the positive electrode active material, and the secondary battery, the respective samples of special reagents manufactured by Wako Pure Chemical Industries, Ltd. were used.

Example 1

A powder of lithium-metal composite oxide represented by $Li_{1.030}Ni_{0.82}Co_{0.15}Al_{0.03}O_2$ and obtained by a known technique of mixing an oxide powder containing Ni as a main component and lithium hydroxide followed by firing was used as a base material.

The lithium-metal composite oxide powder had an average particle size of 12.4 μm and a specific surface area of 0.3 $m^2/g$. The average particle size was evaluated using a volume integrated average in the laser diffraction light-scattering method, and the specific surface area was evaluated using the BET method by nitrogen gas adsorption.

15.6 g of tungsten oxide ($WO_3$) was added into an aqueous solution in which 5.6 g of lithium hydroxide (LiOH) was dissolved in 100 ml of pure water, followed by stirring, to obtain an alkaline solution (W) containing tungsten.

Next, 75 g of a lithium-metal composite oxide powder as a base material was immersed in the produced alkaline solution (W), followed by further stirring, to be sufficiently mixed, and the lithium-metal composite oxide powder was also washed with water at the same time. Thereafter, solid-liquid separation was performed thereon by filtration using a Buchner funnel, to obtain a tungsten-containing mixture formed from the alkaline solution (W) and the lithium-metal composite oxide powder.

The obtained mixture was put into a firing container made of SUS, and the temperature was raised in vacuum atmosphere at a rate of temperature increase of 2.8° C./minute up to 210° C. for heat treatment for 13 hours, followed by cooling to room temperature in the furnace.

Finally, a sieve with a mesh opening of 38 μm was applied for deagglomeration, to obtain a positive electrode active material having a compound containing W and Li on the surface of the primary particles.

As a result of analyzing the tungsten content and the ratio Li/M in the obtained positive electrode active material by the ICP method, the composition was confirmed to be such that the tungsten content was 0.5 at % with respect to the total number of atoms of Ni, Co and M, and the Li/Me was 0.994.

[Morphological Analysis of LW Compound]

The obtained positive electrode active material was embedded into a resin, and cross-section polishing was performed thereon. The cross section of the resultant was observed by a field emission scanning electron microscope (SEM) at 5000-fold magnification, and it was confirmed that the resultant was constituted by primary particles and secondary particles formed by aggregation of the primary particles, and fine particles of the LW compound were formed on the surface of the primary particles, and the fine particles observed had a particle size of 20 to 180 nm.

Further, the positive electrode active material was embedded into a resin and the cross section thereof was processed, and thereafter the cross sections of any 50 or more of the secondary particles were observed by a field emission scanning electron microscope at 5000-fold magnification. The percentage of the secondary particles having the LW compound on the surface of the primary particles inside the secondary particles with respect to the number of the secondary particles observed (percentage indicating existence of the compound) was 97%.

Further, the vicinity of the surface of the primary particles of the obtained positive electrode active material was observed by a transmission electron microscope (TEM), and it was confirmed that coating of lithium tungstate with a film thickness of 2 to 105 nm was formed on the surface of the primary particles, and the compound was the lithium tungstate.

[Evaluation of Battery]

The battery characteristics of the coin type battery 1 shown in FIG. 3 having a positive electrode produced using the obtained positive electrode active material were evaluated. The positive electrode resistance was shown as a relative value, taking the evaluation value of Example 1 as 100. The initial discharge capacity was 204.6 mAh/g.

Hereinafter, for Examples 2 and 3, and Comparative Examples 1 and 2, only materials and conditions changed from those in Example 1 above are shown. Further, the evaluation values of the initial discharge capacity and the positive electrode resistance of Examples 1 to 3, and Comparative Examples 1 and 2 are shown in Table 1.

[Analysis of Excess Lithium]

The state of excess lithium in the obtained positive electrode active material was evaluated by titrating Li eluted from the positive electrode active material.

Pure water was added to the obtained positive electrode active material and stirred for a certain time, and then filtrated to obtain a filtrate. Hydrochloric acid was added to the filtrate while measuring the pH until the point of neutralization emerged. When the state of a compound containing lithium eluted at the point of neutralization was evaluated, the amount of excess lithium was 0.018 mass % with respect to the total amount of the positive electrode active material.

Example 2

A positive electrode active material for nonaqueous electrolyte secondary batteries was obtained and also evaluated in the same conditions as in Example 1 except that 3.8 g of LiOH and 10.5 g of $WO_3$ were used. The results are shown in Table 1.

Example 3

A positive electrode active material for nonaqueous electrolyte secondary batteries was obtained and also evaluated in the same conditions as in Example 1 except that 7.0 g of LiOH and 19.3 g of $WO_3$ were used. The results are shown in Table 1.

Comparative Example 1

1.4 g of $WO_3$ was added into an aqueous solution in which 0.6 g of LiOH was dissolved in 5 ml of pure water, followed by stirring, to obtain an alkaline solution (W) containing tungsten.

A positive electrode active material for nonaqueous electrolyte secondary batteries was obtained and also evaluated in the same conditions as in Example 1 except that 75 g of a lithium-metal composite oxide powder as a base material was immersed in 100 ml of pure water, followed by stirring, to perform water washing, solid-liquid separation treatment using a Buchner funnel was conducted, and thereafter the produced alkaline solution (W) was added and mixed. The results are shown in Table 1.

The water content in the state where solid-liquid separation was performed after immersion in 100 ml of pure water was 8.5 mass %, and the solid-liquid ratio in mixing with the alkaline solution (W) was 6590 g/L.

Comparative Example 2

The same manner and evaluation as in Example 1 were performed except that water washing was performed by pure water as in Comparative Example 1, but immersion in an alkaline solution (W) was not performed.

1.632 parts by weight of ammonium paratungstate $((NH_4)_{10}W_{12}O_{41}\cdot 5H_2O)$ was added to 100 parts by weight of the composite oxide particles, and sufficiently mixed in a mortar to provide a mixture, and the mixture was fired in an oxygen stream at 700° C. for 4 hours and cooled to room temperature, and thereafter taken out and pulverized, to produce a positive electrode active material of Conventional Example.

The obtained positive electrode active material was used, and evaluated as in Example 1. The results are shown in Table 1. In Conventional Example, no morphological analysis of the LW compound was performed.

TABLE 1

| | W concentration in positive electrode active material [at %] | Alkaline solution | | | Percentage indicating existence of fine particles [%] | Compound on surface of primary particles | | Initial discharge capacity [mAh/g] | Positive electrode resistance | Excess Li [wt %] |
|---|---|---|---|---|---|---|---|---|---|---|
| | | W concentration [mol/L] | Solid-liquid ratio [g/L] | Heat treatment conditions | | Form | Particle size [nm] | Film thickness [nm] | | | |
| Example 1 | 0.5 | 0.6 | 750 | 210° C. × 13 hr | 97 | Thin film + fine particles | 20 to 180 | 2 to 105 | 204.6 | 100 | 0.018 |
| Example 2 | 0.2 | 0.4 | 750 | 210° C. × 13 hr | 96 | Thin film | — | 1 to 75 | 205.5 | 116 | 0.020 |
| Example 3 | 0.6 | 0.7 | 750 | 210° C. × 13 hr | 98 | Thin film + fine particles | 30 to 185 | 2 to 115 | 200.0 | 108 | 0.015 |
| Comparative Example 1 | 0.5 | 0.9 | 6590 | 210° C. × 13 hr | 62 | Thin film + fine particles | 20 to 210 | 2 to 160 | 197.9 | 137 | 0.038 |
| Comparative Example 2 | 0 | — | — | 210° C. × 13 hr | — | — | — | — | 198.2 | 235 | 0.040 |
| Conventional Example | | $Li_{1.03}Ni_{0.77}Co_{0.20}Al_{0.03}O_2$/ Ammonium paratungstate | | | — | — | — | — | 179.9 | 218 | 0.042 |

The results are shown in Table 1.

Conventional Example

The same method as in Examples disclosed in Patent Literature 4 was used, nickel sulfate, cobalt sulfate and sodium aluminate were dissolved in water, a sodium hydroxide solution was further added with sufficient stirring, to produce a nickel-cobalt-aluminum composite hydroxide co-precipitate so that the molar ratio of Ni, Co and Al satisfied Ni:Co:Al=77:20:3, the co-precipitate was washed with water and dried, and thereafter lithium hydroxide-monohydrate was added to adjust the molar ratio so that Li:(Ni+Co+Al)=105:100 was satisfied, thereby producing a precursor.

Next, the precursor was fired in an oxygen stream at 700° C. for 10 hours, cooled to room temperature, and thereafter pulverized to obtain composite oxide particles mainly containing lithium nickelate represented by the compositional general formula: $Li_{1.03}Ni_{0.77}Co_{0.20}Al_{0.03}O_2$.

[Evaluation]

As is obvious from Table 1, the composite oxide particles and the positive electrode active materials of Examples 1 to 3 were produced according to the present invention and therefore formed batteries having high initial discharge capacity and low positive electrode resistance as compared with Conventional Example, and excellent characteristics. In particular, those of Example 1 performed in preferable conditions of the amount of tungsten added and the tungsten concentration in the alkaline solution were better in initial discharge capacity and positive electrode resistance, and more suitable in a positive electrode active material for nonaqueous electrolyte secondary batteries.

Figure 2:
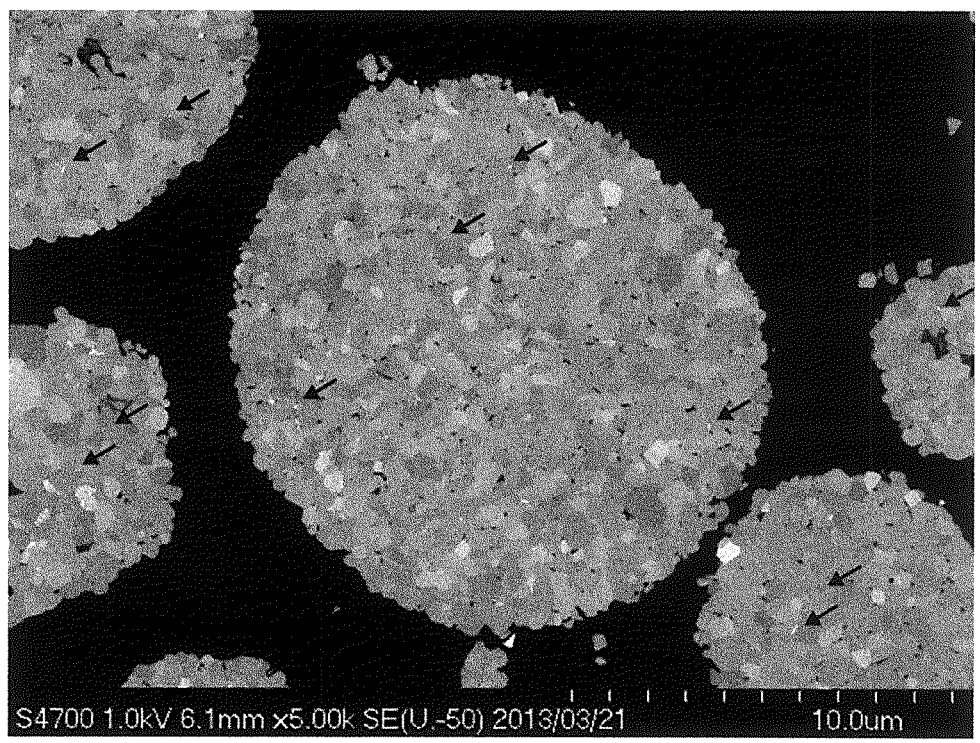
FIG. 2 is a SEM image (5000-fold magnification in observation) of a cross section of the lithium-metal composite oxide of the present invention.

Further, it was confirmed from an example of the cross-sectional observation results by SEM of the positive electrode active material obtained in the examples of the present invention, shown in FIG. 2, that the obtained positive electrode active material was composed of primary particles and secondary particles formed by aggregation of the primary particles, and the LW compound (indicated by black arrows) was formed on the surface of the primary particles.

In Example 2 where the small amount of tungsten was added, the amount of the LW compound formed was too small. Thus, the positive electrode resistance was increased and excess Li was also increased as compared with Example 1.

Further, in Example 3 where the large amount of tungsten was added, the amount of the LW compound formed was so large that the positive electrode resistance was increased, but excess Li was decreased as compared with Example 1.

Meanwhile, in Comparative Example 1, in which the amount of tungsten with respect to the number of atoms of Ni, Co and M contained in the lithium-metal composite oxide powder was almost the same as in Example 1, uniform dispersion was not obtained by a method where a liquid was added and mixed, and the compound containing tungsten and lithium was formed unevenly, thereby resulting in an increase in positive electrode resistance and also an increase in excess Li as compared with those of Example 1.

In Comparative Example 2, the LW compound in the present invention was not formed on the surface of the primary particles, and therefore the positive electrode resistance was considerably high and it was difficult to meet the requirement to enhance the power.

In Conventional Example, since the mixing with the solid tungsten compound was performed, tungsten was not sufficiently dispersed and lithium was not supplied into the compound, resulting in considerably high positive electrode resistance.

It can be confirmed from the above results that a nonaqueous electrolyte secondary battery using the positive electrode active material of the present invention has high initial discharge capacity and also low positive electrode resistance and forms a battery having excellent characteristics.

The nonaqueous electrolyte secondary battery of the present invention is suitable for power sources of small portable electronic devices (such as laptop personal computers and mobile phone terminals) that constantly require high capacity and is suitable for batteries for electric cars that require high power.

Further, the nonaqueous electrolyte secondary battery of the present invention has excellent safety and allows size reduction and power enhancement, and therefore it is suitable as a power source for electric cars where there is a restriction on the mounting space. The present invention can be used not only as a power source for electric cars which are purely driven by electric energy but also as a power source for so-called hybrid vehicles that is used in combination with a combustion engine such as a gasoline engine and a diesel engine.

REFERENCE SIGNS LIST

1: Coin type battery
2: Case
2a: Positive electrode can
2b: Negative electrode can
2c: Gasket
3: Electrode
3a: Positive electrode
3b: Negative electrode
3c: Separator

What is claimed is:

1. A method of producing a positive electrode active material for nonaqueous electrolyte secondary batteries, comprising:

a first step of mixing a lithium-metal composite oxide powder which is represented by a general formula: $Li_zNi_{1-x-y}Co_xM_yO_2$ (where $0 \leq x \leq 0.35$, $0 \leq y \leq 0.35$, and $0.95 \leq z \leq 1.30$ are satisfied, and M is at least one element selected from Mn, V, Mg, Mo, Nb, Ti and Al) and has a layered crystal structure constituted by primary particles and secondary particles formed by aggregation of the primary particles, to an alkaline solution with a tungsten compound dissolved therein at a tungsten concentration of 0.1 to 2 mol/L so that a solid-liquid ratio of the lithium-metal composite oxide powder to an amount of water in the alkaline solution falls within a range of 200 to 2500 g/L, and immersing a resulting mixture, followed by solid-liquid separation, to obtain a tungsten-containing mixture in which an amount of tungsten contained therein is controlled and tungsten is uniformly dispersed on a surface of the primary particles of the lithium-metal composite oxide; and a second step of subjecting the tungsten-containing mixture to heat treatment to thereby form a compound containing tungsten and lithium on the surface of the primary particles of the lithium-metal composite oxide.

2. The method of producing a positive electrode active material for nonaqueous electrolyte secondary batteries according to claim 1, further comprising a water washing step of washing the lithium-metal composite oxide powder with water, before the first step is performed.

3. The method of producing a positive electrode active material for nonaqueous electrolyte secondary batteries according to claim 2, wherein the tungsten-containing mixture contains tungsten in an amount of 3.0 at % or less with respect to a total number of atoms of Ni, Co and M contained in the lithium-metal composite oxide powder used in the mixing.

4. The method of producing a positive electrode active material for nonaqueous electrolyte secondary batteries according to claim 3, wherein the alkaline solution with the tungsten compound dissolved therein has a tungsten concentration of 0.05 to 2 mol/L.

5. The method of producing a positive electrode active material for nonaqueous electrolyte secondary batteries according to claim 4, wherein the alkaline solution is made by dissolving a tungsten compound in an aqueous lithium hydroxide solution.

6. The method of producing a positive electrode active material for nonaqueous electrolyte secondary batteries according to claim 1, wherein the mixing of the alkaline solution with the tungsten compound dissolved therein with the lithium-metal composite oxide powder is performed in the alkaline solution of the tungsten compound as a liquid and at a temperature of 50° C. or less.

7. The method of producing a positive electrode active material for nonaqueous electrolyte secondary batteries according to claim 1, wherein the heat treatment of the second step is performed in an oxygen atmosphere or a vacuum atmosphere at 100 to 600° C.

8. The method of producing a positive electrode active material for nonaqueous electrolyte secondary batteries according to claim 1, wherein the tungsten-containing mixture contains tungsten in an amount of 3.0 at % or less with respect to a total number of atoms of Ni, Co and M contained in the lithium-metal composite oxide powder used in the mixing.

9. The method of producing a positive electrode active material for nonaqueous electrolyte secondary batteries according to claim 1, wherein the alkaline solution with the tungsten compound dissolved therein has a tungsten concentration of 0.05 to 2 mol/L.

10. The method of producing a positive electrode active material for nonaqueous electrolyte secondary batteries according to claim 1, wherein the alkaline solution is made by dissolving a tungsten compound in an aqueous lithium hydroxide solution.

\* \* \* \* \*